United States Patent Office 3,503,205
Patented Mar. 31, 1970

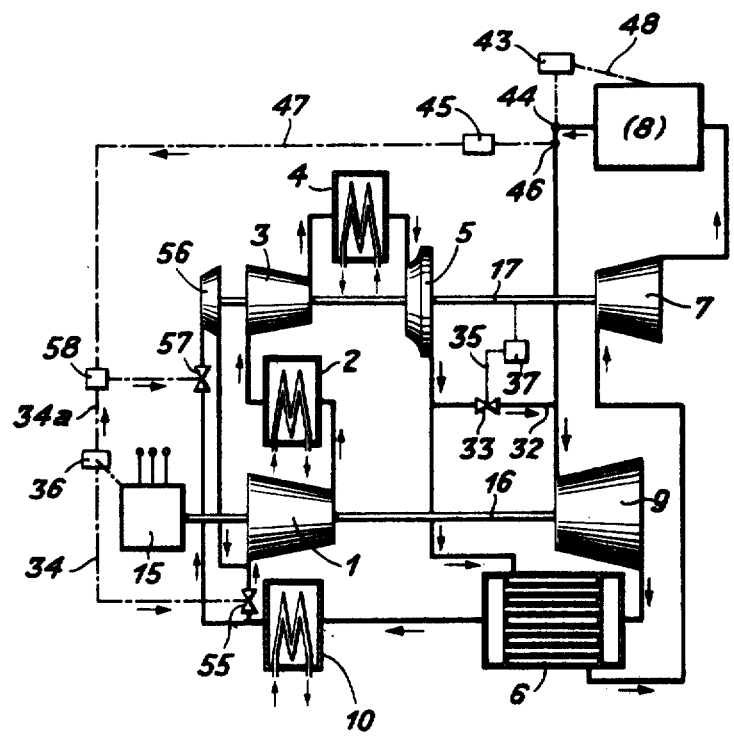

---

3,503,205
GAS TURBINE POWER PLANT
Peter Suter, Zurich, Switzerland, assignor to Sulzer Brothers Limited, Winterthur, Switzerland, a Swiss company
Filed July 29, 1968, Ser. No. 748,364
Claims priority, application Switzerland, July 27, 1967, 10,682/67
Int. Cl. F01k 25/00, 3/18
U.S. Cl. 60—36    3 Claims

ABSTRACT OF THE DISCLOSURE

There is disclosed a $CO_2$ gas turbine power plant including high and low pressure turbines and high and low pressure compressors on separate shafts, with an adjustable valve in the $CO_2$ flow path upstream of the low pressure compressor and a regenerative turbine coupled to the high pressure shaft and connected in parallel with the valve.

---

The present invention pertains to a gas turbine power plant including at least two expansion stages on separate shafts, with heating of the working substance between them, and at least two stages of compression, with cooling of the working substance between those compression stages.

It is an object of the invention to improve the regulation and the efficiency of such a plant in operation on partial load. In accordance with the invention a controllable throttling device is inserted into the flow path of the working substance upstream of the low pressure compressor, and a heat recovery turbine is connected in parallel with that throttling device, this turbine being coupled to the high pressure shaft, i.e. the shaft of the high pressure turbine.

The invention can be applied to both open and closed cycle plants. Its effectiveness is due to the fact that the input pressure to the low pressure compressor is reduced so that in turn the quantity of working substance flowing into the low pressure compressor per unit time is reduced. For partial load regulation, it is desirable to adjust the opening of the throttling device in response to the output of a demand load indicating device.

In gas turbine plants employing a closed $CO_2$ cycle in conjunction with a nuclear reactor as a heat source, the invention can be employed for protection of the reactor against excessive pressures and temperatures, the plant being so operated that the pressure and temperature upstream of the low pressure turbine are held at least approximately constant.

BRIEF DESCRIPTION OF THE DRAWINGS

The invention will now be further described in terms of a non-limitative exemplary embodiment thereof and in conjunction with the accompanying drawing in which the single figure of drawing is a schematic representation of a gas turbine power plant employing $CO_2$ in accordance with the invention.

In the drawing, "lines" or pipes (i.e. conduits) carrying gaseous $CO_2$ are shown as single lines on the paper. Conduits carrying condensate are shown as dashed lines, while signal conduits are shown as dot-dash lines.

In the drawing, the low pressure compressor 1 is disposed on the shaft 16 of the low pressure turbine 9, which also drives the useful output load electric generator 15. The low pressure compressor 1 aspirates expanded cool $CO_2$ gas from the re-cooler 10 and raises it to an intermediate pressure. The gas passes then through an intercooler 2 to an intermediate pressure compressor 3 which is driven from the high pressure turbine 7 via the shaft 17. A high pressure compressor 5 is also coupled to this shaft. From the outlet of the compressor 3 the gas flows through an intercooler 4 and through a high pressure compressor 5 into a regenerator or heat recovery unit 6 before undergoing partial expansion in the high pressure turbine 7. In the regenerator 6 the gas is heated by waste heat from expanded working substance returning from the outlet of the low pressure turbine 9 to the cooler 10. The working substance thus coming from the high pressure compressor 5 passes through the heat recovery unit 6, flowing to the right in the drawing, before being delivered to the high pressure turbine 7.

In the heat exchanger or nuclear reactor 8 downstream of the turbine 7, the $CO_2$ is reheated before being expanded to initial pressure in the low pressure turbine 9 for development of the useful output. In its passage from right to left in the drawing through the heat recovery unit 6 and the cooler 10, the expanded gas is returned to its initial condition upstream of the low pressure compressor 1. Heat is extracted from the gas in its passage from right to left through the cooler 10 by means of a coolant such as water, as is also the case in the intercoolers 2 and 4.

The invention is, of course, not limited to the use of a nuclear reactor as a heat source. Other suitable and conventional heat sources may be employed. The invention is further not restricted to constructions in which the application of heat occurs only upstream of the low pressure turbine 9.

In accordance with the invention an adjustable throttling device 55 is disposed in the flow path of the $CO_2$ working substance upstream of the low pressure compressor 1. The throttling device 55 may be bypassed by means of a recovery or regenerative turbine 56 on the high pressure shaft 17. The flow of working substance through turbine 56 can be adjusted by means of a flow control device or valve 57. The devices 55 and 57 are adjusted via signal lines 34 and 34a from the demand load signal generating device 36, coupled to the generator 15. Optionally, with throttling valve 55 initially open, the flow path through the turbine 56 may be held closed until valve 55 is shifted to effect a certain limitation on the flow of working substance through the compressor 1. The valves 33, 55 and 57 include actuators for adjustment of the setting thereof in response to arriving signals.

For the special case of a power plant employing $CO_2$ as the working substance in conjunction with a nuclear reactor 8, additional control devices are provided for protection of the reactor. One of these devices serves to control the temperature of the $CO_2$ gas emerging from the reactor. It comprises a temperature measuring device 44, a thermostat 43 and a signal line 48 which leads to the reactor 8 and to the mechanism for adjusting the control rods therein.

The second control device serves to regulate the pressure of the $CO_2$ at the outlet of the reactor 8, for example to hold it substantially constant. The pressure is measured by means of a measuring device 46 and the pressure-representative signal measured therein is delivered to the regulator 45 which is coupled by a signal line 47 with an adder 58. In this adding device 58 the signals from the load signal generating device 36 and from the pressure regulator 45 are added together and the sum is employed as a command signal delivered to the flow control device 57. The pressure-representative signal in line 47 serves as a supplementary signal which overrides the signal from the demand signal generating device 36 if certain values of variations of the measured pressures are exceeded. Thus, the load demand signal is corrected by the pressure-representative signal. As already indicated, partial load regulation according to the invention depends upon the fact that the input to the compressor 1 is reduced by operation of the throttling device 55 in conjunction with the turbine 56, so that for constant rotational speed of the low pressure shaft 16 the amount of working substance flowing through the circuit in unit time is reduced.

In order to permit adjustment of the speed of rotation of the high pressure 17, a line 32 is provided between the outlet of the high pressure compressor 5 and the line between the reactor 8 and the low pressure turbine 9. Line 32 is provided with a flow control device 33. The flow control device 33 is adjusted in position in response to a signal from the tachometer 37 on the high pressure shaft 17 and by way of a signal line 35.

While the invention has been described hereinabove in terms of a presently preferred embodiment thereof, the invention is not limited thereto, but rather comprehends all modifications of and departures from that embodiment properly falling within the spirit and scope of the appended claims.

I claim:

1. A gas turbine power plant comprising a high pressure turbine, a heater, a low pressure turbine, a low pressure compressor coupled to the low pressure turbine, an intercooler, and a higher pressure compressor coupled to the high pressure turbine, all connected together for flow of a working substance therethrough successively, adjustable flow control means upstream of the low pressure compressor and a regenerative turbine connected in parallel with said flow control means and coupled to the high pressure turbine.

2. A power plant according to claim 1 including means to generate a signal representative of the load on the low pressure turbine, and means to adjust said flow control means in response to said signal.

3. A power plant according to claim 1 having a closed flow path for the working substance thereof and wherein said heater comprises a nuclear reactor.

References Cited

UNITED STATES PATENTS

| | | |
|---|---|---|
| 2,268,270 | 12/1941 | Traupel. |
| 2,472,846 | 6/1949 | Nettel et al. |
| 2,482,791 | 9/1949 | Nettel et al. |
| 2,658,336 | 11/1953 | Traupel. |

MARTIN P. SCHWADRON, Primary Examiner

ROBERT R. BUNEVICH, Assistant Examiner

U.S. Cl. X.R.

60—39.18, 59